(12) United States Patent
Li et al.

(10) Patent No.: US 10,554,487 B2
(45) Date of Patent: Feb. 4, 2020

(54) PRE-PERSONALIZATION OF ESIMS TO SUPPORT LARGE-SCALE ESIM DELIVERY

(71) Applicant: Apple Inc., Cupertino, CA (US)

(72) Inventors: Li Li, Los Altos, CA (US); Yousuf H. Vaid, Fremont, CA (US); Christopher B. Sharp, Cupertino, CA (US); Arun G. Mathias, Sunnyvale, VA (US); David T. Haggerty, San Francisco, CA (US); Jerrold Von Hauck, Windermere, FL (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 15/157,332

(22) Filed: May 17, 2016

(65) Prior Publication Data

US 2016/0345162 A1    Nov. 24, 2016

Related U.S. Application Data

(60) Provisional application No. 62/163,345, filed on May 18, 2015, provisional application No. 62/163,479, (Continued)

(51) Int. Cl.
*H04L 29/06* (2006.01)
*H04L 12/24* (2006.01)
(Continued)

(52) U.S. Cl.
CPC ....... *H04L 41/0806* (2013.01); *H04B 1/3816* (2013.01); *H04B 1/3827* (2013.01)

(58) Field of Classification Search
CPC .... H04W 12/06; H04W 8/183; H04B 1/3816; H04L 41/0806
See application file for complete search history.

(56) References Cited

U.S. PATENT DOCUMENTS 9,843,585 B2   12/2017   Haggerty et al.
9,877,194 B2    1/2018   Schell et al.
                         (Continued)

FOREIGN PATENT DOCUMENTS

EP   2448216 A1    5/2012
JP   2012085272 A  4/2012
                   (Continued)

OTHER PUBLICATIONS

GSM Association, "Embedded SIM Remote Provisioning Architecture", Dec. 17, 2013, Version 1.1, GSM Association pp. 1-84.*
(Continued)

*Primary Examiner* — Harunur Rashid
(74) *Attorney, Agent, or Firm* — Dickinson Wright RLLP

(57) ABSTRACT

Representative embodiments described herein set forth techniques for optimizing large-scale deliveries of electronic Subscriber Identity Modules (eSIMs) to mobile devices. Specifically, instead of generating and assigning eSIMs when mobile devices are being activated—which can require significant processing overhead—eSIMs are pre-generated with a basic set of information, and are later-assigned to the mobile devices when they are activated. This can provide considerable benefits over conventional approaches that involve generating and assigning eSIMs during mobile device activation, especially when new mobile devices (e.g., smartphones, tablets, etc.) are being launched and a large number of eSIM assignment requests are to be fulfilled in an efficient manner.

20 Claims, 7 Drawing Sheets

Related U.S. Application Data filed on May 19, 2015, provisional application No. 62/258,382, filed on Nov. 20, 2015.

(51) Int. Cl.
*H04B 1/3816* (2015.01)
*H04B 1/3827* (2015.01)

(56) References Cited

U.S. PATENT DOCUMENTS

| | | | |
|---|---|---|---|
| 2012/0106443 A1 | 5/2012 | Chen et al. | |
| 2012/0108295 A1* | 5/2012 | Schell | H04W 8/265 455/558 |
| 2013/0157673 A1* | 6/2013 | Brusilovsky | H04W 4/70 455/450 |
| 2013/0227646 A1* | 8/2013 | Haggerty | H04L 63/0853 726/3 |
| 2013/0303122 A1* | 11/2013 | Li | H04W 8/20 455/411 |
| 2014/0004827 A1* | 1/2014 | O'Leary | H04W 8/22 455/411 |
| 2014/0024361 A1* | 1/2014 | Poon | H04W 12/06 455/419 |
| 2014/0031012 A1 | 1/2014 | Park et al. | |
| 2014/0349617 A1 | 11/2014 | Li et al. | |

FOREIGN PATENT DOCUMENTS

| | | |
|---|---|---|
| JP | 2012095306 A | 5/2012 |
| JP | 2015512209 A | 4/2015 |
| JP | 2015522976 A | 8/2015 |
| WO | 2012012526 A1 | 1/2012 |
| WO | 2013169484 A1 | 11/2013 |

OTHER PUBLICATIONS

PCT Patent Application No. PCT/US2016/031670—International Search Report and Written Opinion dated Aug. 18, 2016.

European Patent application 16796948.4—Extended European Search Report dated Oct. 10, 2018.

Japanese Patent Application No. 2017-557362—First Office Action dated Nov. 30, 2018.

* cited by examiner

PRE-PERSONALIZATION OF ESIMS TO SUPPORT LARGE-SCALE ESIM DELIVERY

CROSS-REFERENCE TO RELATED APPLICATION

This application claims priority to: U.S. Provisional Patent Application No. 62/163,345, entitled "Pre-Personalization of eSIMs to Support Large-Scale eSIM Delivery," filed May 18, 2015; U.S. Provisional Patent Application No. 62/163,479, entitled "Pre-Personalization of eSIMs to Support Large-Scale eSIM Delivery," filed May 19, 2015; and U.S. Provisional Patent Application No. 62/258,382, entitled "Pre-Personalization of eSIMs to Support Large-Scale eSIM Delivery," filed Nov. 20, 2015, the entire contents of each of which are incorporated herein by reference.

FIELD

The described embodiments set forth a technique for optimizing the manner in which an electronic Subscriber Identity Module (eSIM) is provisioned to a mobile device in order to facilitate robust large-scale delivery of eSIMs to mobile devices.

BACKGROUND

Many mobile devices are configured to utilize Universal Integrated Circuit Cards (UICCs) that enable the mobile devices to access services provided by Mobile Network Operators (MNOs). In particular, each UICC includes at least a microprocessor and a read-only memory (ROM), where the ROM is configured to store an MNO profile that a mobile device can utilize to register and interact with an MNO. Typically, a UICC takes the form of a small removable card (commonly referred to as a Subscriber Identity Module (SIM) card) that is configured to be inserted into a UICC-receiving bay included in a mobile device. In more recent implementations, however, UICCs are being embedded directly into system boards of mobile devices. These electronic/embedded UICCs (eUICCs) can provide advantages over traditional SIM cards, e.g., an eUICC can store a number of MNO profiles—referred to herein as electronic Subscriber Identity Modules (eSIMs)—and can eliminate the need to include UICC-receiving bays in mobile devices. Moreover, eSIMs can be remotely provisioned to mobile devices, which can substantially increase flexibility when users purchase mobile devices, travel to different countries, migrate their phone numbers to different MNOs, and the like.

Despite the various advantages provided by eSIMs, particular issues remain that have yet to be addressed. One issue, for example, involves the large-scale distribution of eSIMs, e.g., during a product launch of a widely-purchased mobile device. Specifically, existing eSIM distribution techniques involve generating an eSIM in response to receiving an activation request from a mobile device (e.g., during a first power-on of the mobile device) and delivering the eSIM to the mobile device. Importantly, this process can establish bottlenecks that slow the mobile device activation process and degrade overall end-user satisfaction.

SUMMARY

Representative embodiments described herein set forth techniques for optimizing large-scale deliveries of eSIMs to mobile devices. Specifically, instead of generating and assigning eSIMs when mobile devices are being activated—which can require significant processing overhead—eSIMs are pre-generated with a basic set of information, and are later-assigned to the mobile devices when they are activated. This can provide considerable benefits over conventional approaches that involve generating and assigning eSIMs during mobile device activation, especially when new mobile devices (e.g., smartphones, tablets, etc.) are being launched and a large number of eSIM assignment requests are to be fulfilled in an efficient manner. According to some embodiments, the techniques can be separated into three different stages, which are described herein in greater detail.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
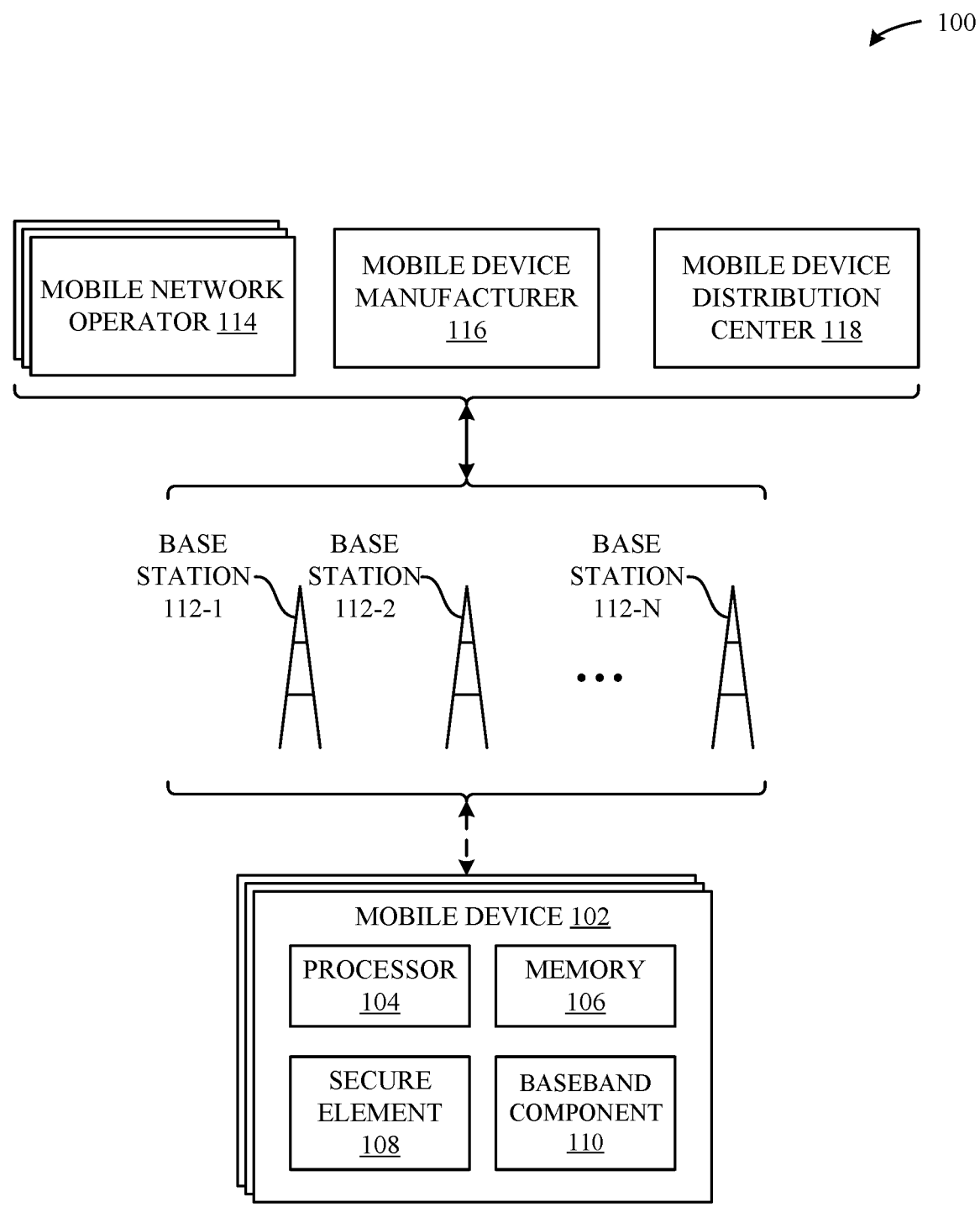
FIG. 1 illustrates a block diagram of different components of a system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative embodiments described herein set forth techniques for optimizing large-scale deliveries of eSIMs to mobile devices. According to some embodiments, eSIMs are pre-generated (e.g., during or upon completion of a manufacturing stage of the mobile device) with a basic set of information, and are later-assigned to the mobile devices when they are activated. This can provide considerable benefits over the conventional approach of generating and assigning eSIMs during mobile device activation, especially when new mobile devices are being launched and a large number of eSIM assignment requests need to be fulfilled in an efficient manner. According to some embodiments, the techniques can be separated into three different stages, which are described below in greater detail.

A first stage occurs when a mobile device is being manufactured (e.g., at an Original Equipment Manufacturer (OEM)), and involves a "factory broker" that requests an eUICC included in the mobile device to generate a challenge that will subsequently be used to pre-personalize an eSIM for the mobile device. According to the techniques set forth herein, the factory broker—as well as other entities associated with the OEM—can be implemented by the OEM itself, or can be separate from the OEM (e.g., a third party service). Notably, as the mobile device remains in (or is entering out of) the manufacturing phase at the OEM, the Mobile Network Operator (MNO)/type of eSIM that ultimately will be utilized by the mobile device remains unknown, as several factors can play into the locale in which the mobile device will ultimately be sold and utilized. To account for this uncertainty, special values are assigned to MNO/eSIM type fields in a "profile request blob" to indicate that actual assignments for these fields will take place at a subsequent time. A more detailed breakdown of the various steps of this first stage are described below in conjunction with FIG. 3.

A second stage occurs upon an identification of an MNO (also referred to herein as a "target carrier") to which the mobile device will be subscribed. The second stage can commence, for example, in response to a notification that the mobile device is shipping and will soon be delivered to a retailer, to an end-user, and the like. According to some embodiments, the shipment notification includes information that indicates an MNO to which the mobile device will be subscribed, as well as a type of eSIM that will be utilized by the mobile device. In response to the shipment notification, a "client profile agent"—which possesses a Layer 2 (L2) security level within the context of the techniques described herein, and is implemented at a distribution center that handles delivery of the mobile device—acts as a proxy for an L2 component of the eUICC included in the mobile device. Specifically, the client profile agent regenerates the profile request blob (similar to the profile request blob established in the first stage) and assigns values to the MNO/eSIM type fields in accordance with the information included in the shipment notification. The client profile agent can also be configured to generate a new challenge as a replacement for the challenge generated during the first stage (otherwise, uniqueness of challenges among all L2 components would need to be guaranteed, which can be problematic).

Next, the client profile agent can be configured to cryptographically sign the profile request blob using a private key known to the client profile agent. Notably, the profile request blob will continue to possess an L1 signature associated with the eUICC included in the mobile device, as the eSIM will be in an encrypted form when ultimately delivered to the mobile device, and the eUICC will need to decrypt the encrypted eSIM in order to install the eSIM and consume services provided by the MNO. Next, the profile request blob is sent to a "server broker" using a "personalizeProfile( )" command. From the perspective of the server broker, the techniques set forth herein do not differ from existing scenarios, which can be beneficial as a form of legacy support is achieved and substantial modifications are not required. More specifically, the server broker is configured to return a batch descriptor to the client profile agent, and personalize the eSIM for the mobile device. In turn, the client profile agent creates a new batch descriptor with the challenge generated by the eUICC in the first stage, which will be used at a subsequent time when the eUICC requests delivery of the eSIM. A more detailed breakdown of the various steps of this second stage are described below in conjunction with FIG. 4.

Finally, a third stage occurs when an end user of the mobile device powers-on the mobile device. More specifically, when the mobile device is powered-on (or when the mobile device powers-on and detects no eSIMs are installed on the eUICC included in the mobile device), the mobile device issues a "getProfileOptions( )" command to the eUICC to identify the available options for eSIM operation. As an eSIM is pre-personalized for the mobile device by way of the first stage and the second stage described above, the response to the "getProfileOptions( )" command would include a valid batch descriptor, where the mobile device is not required to issue a "personalizeProfile( )" command (as with conventional approaches). Instead, the mobile device can utilize the information included in the descriptor to directly retrieve the pre-personalized eSIM using a "getProfile( )" command. A more detailed breakdown of the various steps of this third stage are described below in conjunction with FIG. 5.

Additional embodiments are set forth herein that enable two or more eSIMs to be pre-personalized for the mobile device in a manner that enables a user to select from different available MNOs upon acquiring the mobile device for use. As previously set forth herein, when the mobile device is manufactured, limited information is available with respect to the locale in which the mobile device will ultimately be utilized. However, when a mobile device is distributed post-manufacture, more detailed information becomes available, e.g., if a mobile device is being shipped to the United States for sale, it is likely that the mobile device will consume services provided by T-Mobile, Sprint, ATT, or Verizon. In that regard, the foregoing embodiments can be modified to pre-personalize two or more eSIMs for a mobile device to enable a user to choose from different MNOs upon purchasing the mobile device. It is noted that an MNO can represent a Mobile Network Operator that implements its own infrastructure to provide services to mobile devices. Alternatively, an MNO can represent a "virtual" Mobile Network Operator that provides services using the infrastructure of another MNO. Accordingly, the efficiency provided by the foregoing embodiments remains intact as the pre-personalized eSIMs are readily available for the mobile device. Moreover, the unused (i.e., unselected) pre-personalized eSIMs can be disassociated from the mobile device and recycled for future use by other mobile devices, thereby further increasing efficiency. A more detailed breakdown of the various steps of this multiple-eSIM approach are described below in conjunction with FIG. 6.

Accordingly, the techniques described herein provide a mechanism for optimizing large-scale deliveries of eSIMs to mobile devices. A more detailed discussion of these techniques is set forth below and described in conjunction with FIGS. 1-7, which illustrate detailed diagrams of systems and methods that can be used to implement these techniques.

FIG. 1 illustrates a block diagram of different components of a system 100 that is configured to implement the various techniques described herein, according to some embodiments. More specifically, FIG. 1 illustrates a high-level overview of the system 100, which, as shown, includes mobile devices 102 and a group of base stations 112 that are managed by different MNOs 114. According the illustration of FIG. 1, each mobile device 102 can represent a mobile computing device (e.g., an iPhone® or an iPad® by Apple®), and the base stations 112 can represent different radio towers that are configured to enable the mobile devices 102 and MNOs 114 to communicate with one another. According to some embodiments, the MNOs 114 can represent different wireless service providers that provide specific services (e.g., voice and data) to which the mobile devices 102 can be subscribed. As also shown in FIG. 1, the system 100 can also include a mobile device manufacturer 116, which can represent, for example, an original manufacturer of the mobile devices 102. Moreover, the system 100 can include a mobile device distribution center 118, which can represent, for example, an inventory and shipment center that facilitates the delivery of mobile devices 102 from the mobile device manufacturer 116 to retail stores, end-users, and the like. As described in greater detail herein, the mobile device manufacturer 116 and the mobile device distribution center 118 can be configured to carry out different techniques that enable efficient, large-scale delivery of eSIMs to the mobile devices 102.

As shown in FIG. 1, each mobile device 102 can include a processor 104, a memory 106, a secure element 108, and a baseband component 110. These components work in conjunction to enable the mobile devices 102 to provide useful features to users, e.g., localized computing, location-based services, and Internet connectivity. According to some embodiments, the secure element 108 can represent a removable Universal Integrated Circuit Card (UICC) or an embedded/electronic UICC (eUICC). As described in greater detail below, the secure element 108 can be configured to store multiple Electronic Subscriber Identity Modules (eSIMs) for accessing the different MNOs 114 through the base stations 112. For example, the secure element 108 of a mobile device 102 can be configured to store an eSIM for each MNO 114 to which the mobile device 102 is subscribed. Although not illustrated in FIG. 1, a mobile device 102 can also be configured to include a receiving bay for the removable UICC that manages one or more SIMs.

Figure 2:
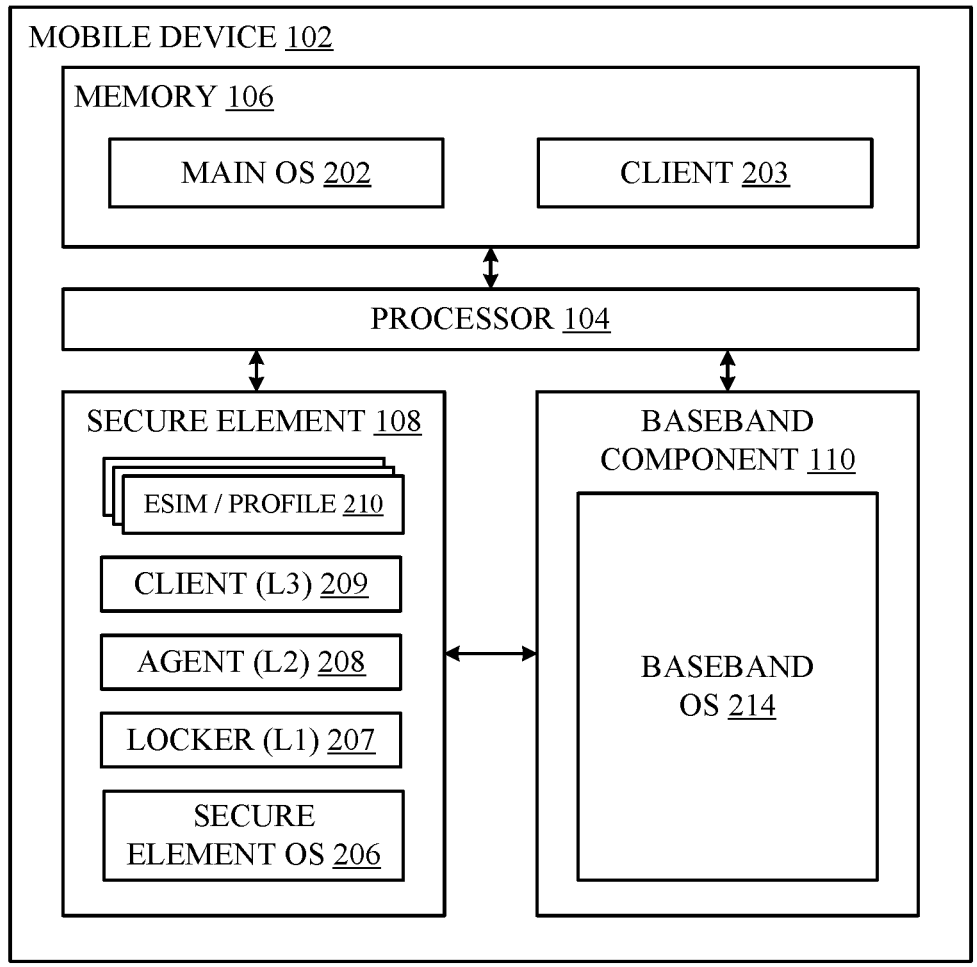
FIG. 2 illustrates a block diagram of a more detailed view of particular components of the system of FIG. 1, according to some embodiments.
Figure 2:
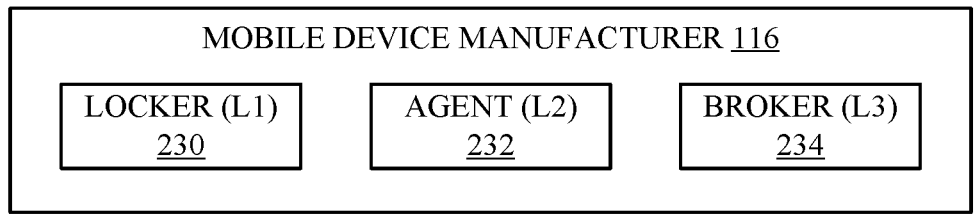
Figure 2:
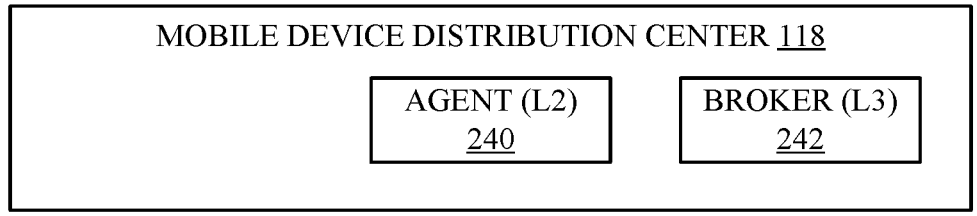

FIG. 2 illustrates a block diagram of a more detailed view 200 of particular components of a mobile device 102 of FIG. 1, according to some embodiments. As shown in FIG. 2, the processor 104, in conjunction with the memory 106, can implement a main operating system (OS) 202 that is configured to execute applications (e.g., native OS applications and user applications). Moreover, the processor 104, in conjunction with the memory 106, can be configured to implement a client 203 that is configured to facilitate communications between the secure element 108 and entities that are external to the mobile device 102 (e.g., the mobile device manufacturer 116 and the mobile device distribution center 118), which enables the various techniques set forth herein to be implemented.

As shown in FIG. 2, the secure element 108 can be configured to implement a secure element OS 206 that is configured to manage the hardware resources of the secure element 108 (e.g., a processor and a memory (not illustrated in FIG. 2)). The secure element 108 can also be configured to implement a locker (L1) 207, an agent (L2) 208, and a client (L3) 209, which represent different entities configured to facilitate the implementation of the techniques described herein. For example, the locker (L1) 207 can be configured to carry out cryptographic functionality (e.g., encrypting, decrypting, digitally signing, etc.) against eSIMs that are received/managed by the secure element 108. The agent (L2) 208 can be configured to carry out techniques to promote eSIM uniqueness within the system 100, e.g., by preventing eSIMs from being cloned in an improper or authorized manner. The client (L3) 209 can be configured to carry out identity, trust, and authorization functionality to promote overall security when the secure element 108 is receiving eSIMs from external entities.

As described above, the secure element 108 can be configured to manage various eSIMs, which are illustrated in FIG. 2 as eSIMs 210 (also referred to herein as "profiles"). Specifically, the management functionality can include activating the eSIMs 210 within the secure element 108 and providing the baseband component 110 with access to the eSIMs 210. Although not illustrated in FIG. 2, each eSIM 210 can be associated with a unique identifier (ID) and can include multiple applets that define the manner in which the eSIM 210 operates. For example, one or more of the applets, when implemented by the baseband component 110 and the secure element 108, can be configured to enable the mobile device 102 to communicate with an MNO 114 and provide useful features (e.g., phone calls and internet) to a user of the mobile device 102.

As also shown in FIG. 2, the baseband component 110 of the mobile device 102 can include a baseband OS 214 that is configured to manage the hardware resources of the baseband component 110 (e.g., a processor, a memory, different radio components, etc.). According to one embodiment, the baseband component 110 can implement a manager (not illustrated in FIG. 2) that is configured to interface with the secure element 108 to implement the various techniques described herein. The manager also can be configured to implement various services (not illustrated in FIG. 2), e.g., a collection of software modules that are instantiated by way of the various applets of activated eSIMs 210 that are managed by the secure element 108. For example, the services can be configured to manage the different connections that exist between the mobile device 102 and the MNOs 114 according to the different eSIMs 210 that are activated.

Further shown in FIG. 2 is a more detailed breakdown of the mobile device manufacturer 116 and the mobile device distribution center 118. According to some embodiments, the mobile device manufacturer 116 can be configured to implement a locker (L1) 230, an agent (L2) 232, and a broker (L3) 234, which, as described in greater detail herein, are configured to facilitate the implementation of the described techniques. According to some embodiments, the mobile device distribution center 118 can be configured to implement an agent (L2) 240 as well as a broker (L3) 242, which, as described in greater detail herein, are further configured to facilitate the implementation of the described techniques.

Figure 3:
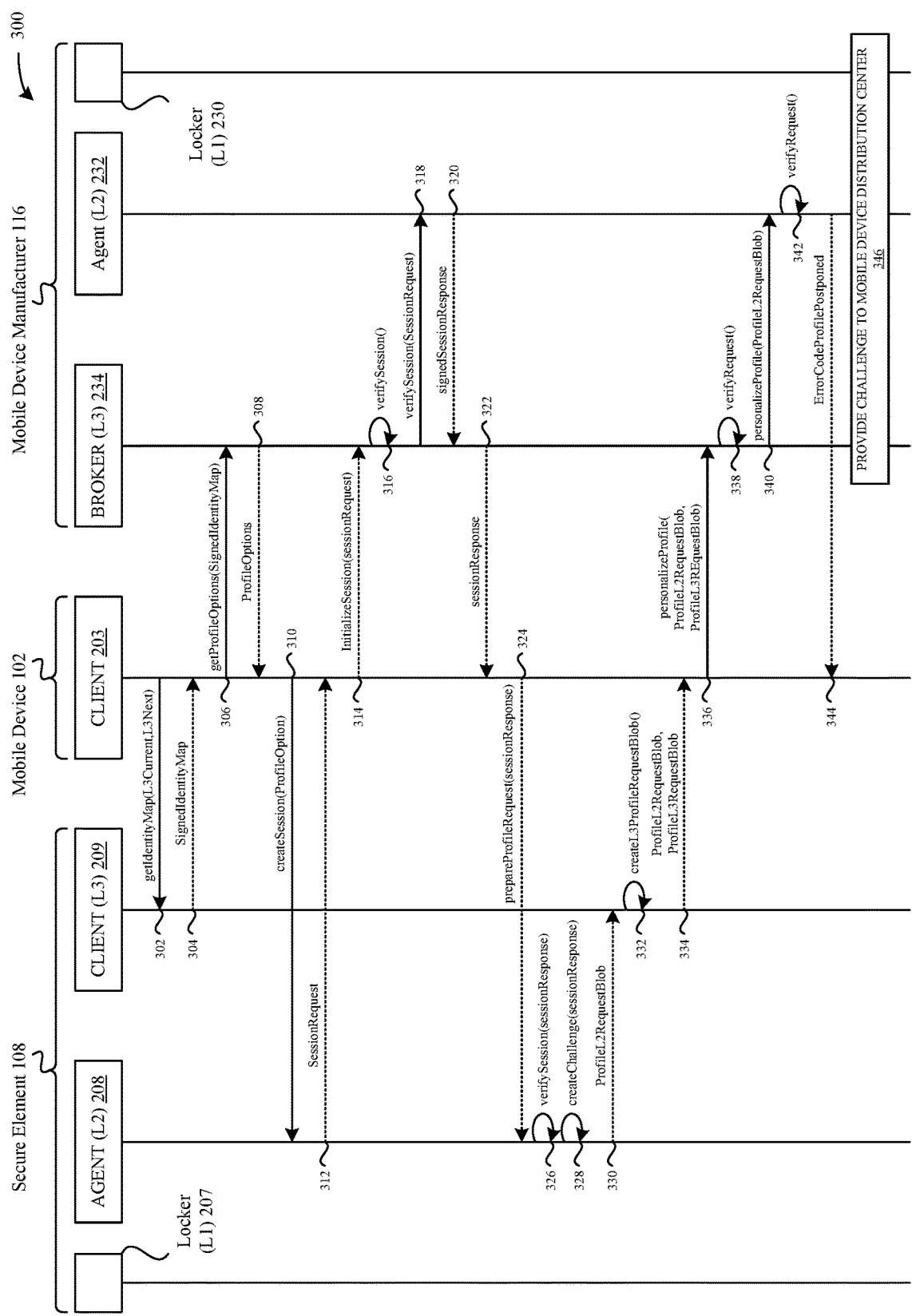
FIG. 3 illustrates a sequence diagram of a method that is carried out between a mobile device and a manufacturer of the mobile device, according to some embodiments.

FIG. 3 illustrates a sequence diagram of a method 300 that is carried out between the mobile device 102 (including the secure element 108) and the mobile device manufacturer 116, according to some embodiments. Specifically, the method 300 represents the first stage of the three stages described herein. As previously described herein, the first stage occurs when a mobile device 102 is being manufactured by the mobile device manufacturer 116, and involves the broker (L3) 234 requesting the secure element 108 included in the mobile device 102 to generate a challenge that will subsequently be used to pre-personalize an eSIM/ profile 210 for the mobile device 102. Notably, as the mobile device 102 remains in (or is entering out of) the manufacturing phase at the mobile device manufacturer 116, the MNO 114/type of eSIM/profile 210 that ultimately will be utilized by the mobile device 102 remains unknown, as several factors can play into the locale in which the mobile device 102 will ultimately be sold and utilized. To account for this uncertainty, special values are assigned to MNO 114/eSIM type fields in a "profile request blob" to indicate that actual assignments for these fields will take place at a subsequent time. The foregoing aspects are described below in greater detail in conjunction with FIG. 3.

As shown in FIG. 3, a first step 302 involves the client 203 issuing a "getIdentityMap(L3Current, L3Next)" command to the client (L3) 209. A next step 304 involves the client (L3) 209 providing a signed identity map to the client 203 (in response to the first step 302). A next step 306 involves the client 203 issuing a "getProfileOptions(SignedIdentityMap)" command to the broker (L3) 234. A next step 308 involves the broker (L3) 234 providing the profile options to the client 203 (in response to the step 306). A next step 310 involves the client 203 issuing a "createSession(ProfileOption)" command to the agent (L2) 208. A next step 312 involves the agent (L2) 208 providing a session request to the client 203 (in response to the step 310). A next step 314 involves the client 203 issuing an "InitializeSession(sessionRequest)" command to the broker (L3) 234. A next step 316 involves the broker (L3) 234 carrying out a "verifySession( )" command (in response to the step 314). A next step 318 involves the broker (L3) 234 issuing a "verifySession(SessionRequest)" command to the agent (L2) 232. A next step 320 involves the agent (L2) 232 providing a signed session response to the broker (L3) 234 (in response to the step 318). A next step 322 involves the broker (L3) 234 providing the session response to the client 203. A next step 324 involves the client 203 issuing a "prepareProfileRequest(sessionResponse)" command to the agent (L2) 208. A next step 326 involves the agent (L2) 208 carrying out a "verifySession(sessionResponse)" command (in response to the step 324). A next step 328 involves the agent (L2) 208 carrying out a "createChallenge(sessionResponse)" command (in response to the steps 324 and 326). A next step 330 involves the agent (L2) 208 providing a profile L2 request blob to the client (L3) 209. A next step 332 involves the client (L3) 209 carrying out a "createL3ProfileRequestBlob( )" command to generate a profile L3 request blob. A next step 334 involves the client (L3) 209 providing the profile L2 request blob and the profile L3 request blob to the client 203. A next step 336 involves the client 203 issuing a "personalizeProfile (ProfileL2RequestBlob, ProfileL3RequestBlob)" command to the broker (L3) 234. A next step 338 involves the broker (L3) 234 carrying out a "verifyRequest( )" command (in response to the step 336). A next step 340 involves the broker (L3) 234 issuing a "personalizeProfile (ProfileL2RequestBlob)" command to the agent (L2) 232. A next step 342 involves the agent (L2) 232 carrying out a "verifyRequest( )" command (in response to the step 340). A next step 344 involves the agent (L2) 232 indicating an "ErrorCodeProfilePostponed" message to the client 203. At a final step 346, the mobile device manufacturer 116 provides the challenge to the mobile device distribution center 118, which is subsequently used to carry out the second and third stages described below in conjunction with FIGS. 4 and 5, respectively.

Figure 4:
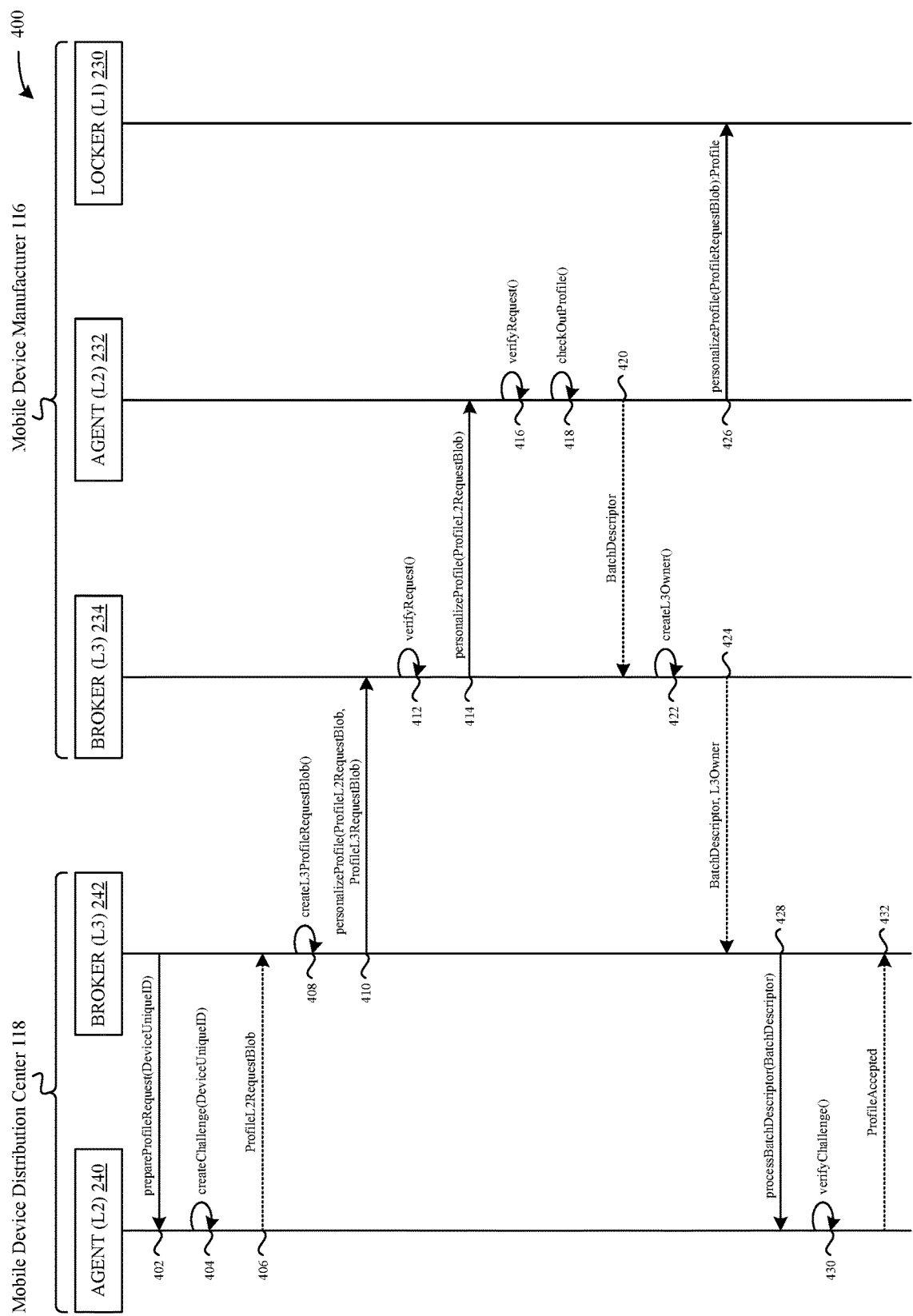
FIG. 4 illustrates a sequence diagram of a method that is carried out between a distribution center for the mobile device and the manufacturer of the mobile device, according to some embodiments.

FIG. 4 illustrates a sequence diagram of a method 400 that is carried out between the mobile device distribution center 118 and the mobile device manufacturer 116, according to some embodiments. Specifically, the method 400 represents the second stage of the three stages described herein. As previously described herein, the second stage commences upon an identification of an MNO 114 to which the mobile device 102 will be subscribed. The second stage can commence, for example, in response to a notification that the mobile device 102 is shipping and will soon be delivered to a retailer, to an end-user, and the like. According to some embodiments, the shipment notification includes information that indicates an MNO 114 to which the mobile device will be subscribed, as well as a type of eSIM/profile 210 that will be utilized by the mobile device 102. In response to the shipment notification, the agent (L2) 240 (associated with the mobile device distribution center 118) acts as a proxy for the agent (L2) 208 associated with the secure element 108 of the mobile device 102, and carries out a specific series of operations that are described below in greater detail in conjunction with FIG. 4.

As shown in FIG. 4, a first step 402 involves the broker (L3) 242 issuing a "prepareProfileRequest(DeviceUniqueID)" command to the agent (L2) 240. A next step 404 involves the agent (L2) 240 carrying out a "createChallenge (DeviceUniqueID)" command (in response to the step 402). A next step 406 involves the agent (L2) 240 providing the profile L2 request blob to the broker (L3) 242. A next step 408 involves the broker (L3) 242 carrying out a "createL3ProfileRequestBlob( )" command. A next step 410 involves the broker (L3) 242 issuing a "personalizeProfile (ProfileL2RequestBlob, ProfileL3RequestBlob)" command to the broker (L3) 234. A next step 412 involves the broker (L3) 234 carrying out a "verifyRequest( )" command (in response to the step 410). A next step 414 involves the broker (L3) 234 issuing a "personalizeProfile (ProfileL2RequestBlob)" command to the agent (L2) 232. A next step 416 involves the agent (L2) 232 carrying out a "verifyRequest( )" command (in response to the step 414). A next step 418 involves the agent (L2) 232 carrying out a "checkOutProfile( )" command (in response to the step 414 and the step 416). A next step 420 involves the agent (L2) 232 providing a batch descriptor to the broker (L3) 234. A next step 422 involves the broker (L3) 234 carrying out a "createL3Owner( )" command to establish an L3 owner. A next step 424 involves the broker (L3) 234 providing the batch descriptor and the L3 owner to the broker (L3) 242. A next step 426 involves the agent (L2) 232 issuing a "personalizeProfile(ProfileRequestBlob):Profile" command to the locker (L1) 230. A next step 428 involves the broker (L3) 242 issuing a "processBatchDescriptor(BatchDescriptor)" command to the agent (L2) 240. A next step 430 involves the agent (L2) 240 carrying out a "verifyChallenge( )" command (in response to the step 428). At a final step 432, the agent (L2) 240 indicates to the broker (L3) 242 that the profile has been accepted.

Figure 5:
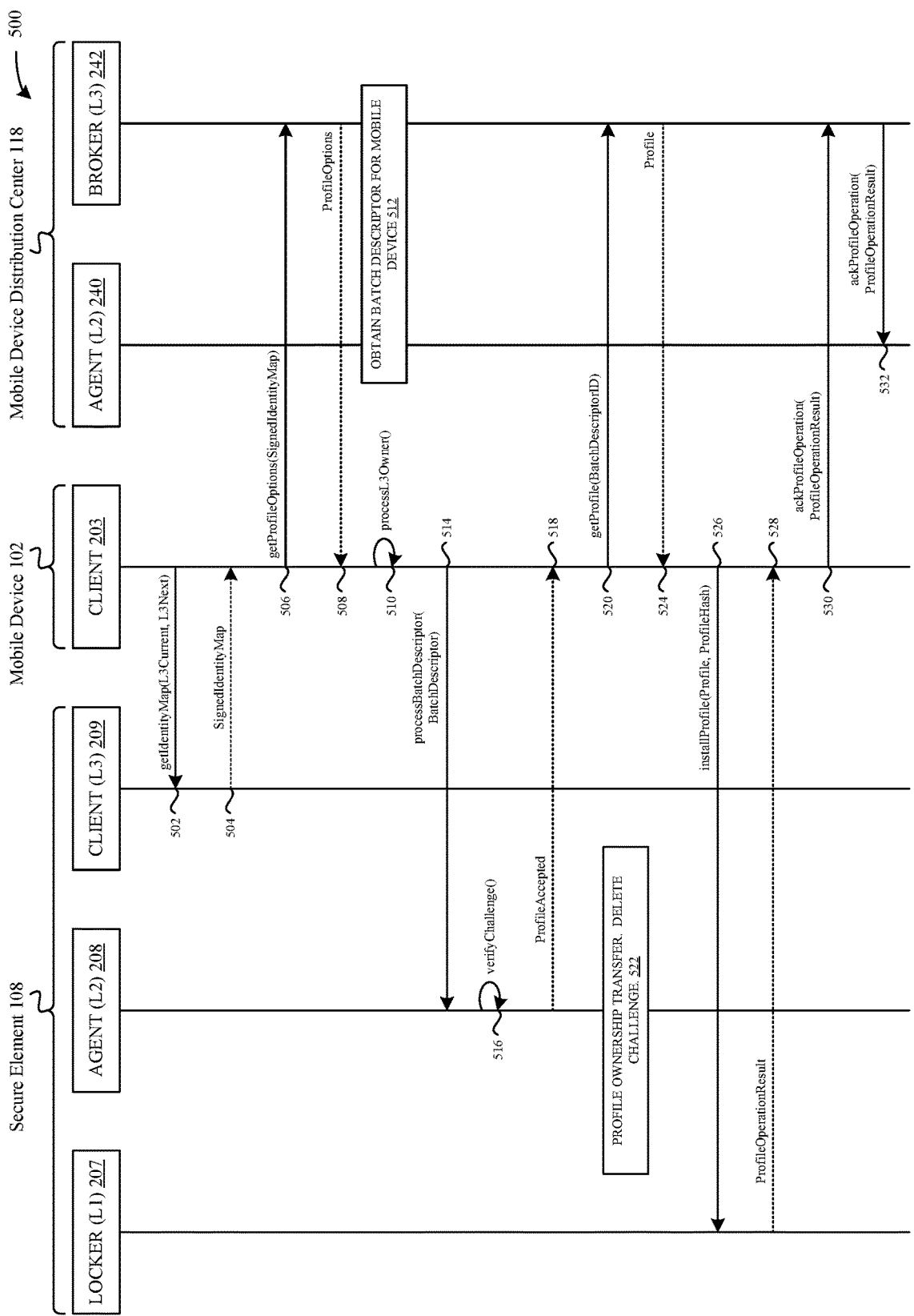
FIG. 5 illustrates a sequence diagram of a method that is carried out between the mobile device and the distribution center for the mobile device, according to some embodiments.

FIG. 5 illustrates a sequence diagram of a method 500 that is carried out between the mobile device 102 (including the secure element 108) and the mobile device distribution center 118, according to some embodiments. Specifically, the method 500 represents the third stage of the three stages described herein. As previously described herein, the third stage commences when an end user of the mobile device 102 powers-on the mobile device 102 (e.g., after obtaining the mobile device 102). A more detailed breakdown of the various steps of this third stage are described below in conjunction with FIG. 5.

As shown in FIG. 5, a first step 502 involves the client 203 issuing a "getIdentityMap(L3Current, L3Next)" command to the client (L3) 209. A next step 504 involves the client (L3) 209 providing the signed identity map to the client 203 (in response to the step 502). A next step 506 involves the client 203 issuing a "getProfileOptions(SignedIdentityMap)" command to the broker (L3) 242. A next step 508 involves the broker (L3) 242 providing profile options to the client 203 (in response to the step 506). A next step 510 involves the client 203 carrying out a "processL3Owner( )" command (in response to receiving the profile options at step 508). A next step 512 involves the mobile device distribution center 118 receiving the batch descriptor for the mobile device 102. A next step 514 involves the client 203 issuing a "processBatchDescriptor(BatchDescriptor)" command to the agent (L2) 208. A next step 516 involves the agent (L2) 208 carrying out a "verifyChallenge( )" command (in response to the step 514). A next step 518 involves the agent (L2) 208 indicating to the client 203 that the profile has been accepted. A next step 520 involves the client 203 issuing a "getProfile(BatchDescriptorID)" command to the broker (L3) 242. A next step 522 involves a profile ownership transfer, whereupon the challenge is deleted. A next step 524 involves the broker (L3) 242 providing the profile to the client 203. A next step 526 involves the client 203 issuing an "installProfile(Profile, ProfileHash)" command to the locker (L1) 207. A next step 528 involves the locker (L1) 207 indicating to the client 203 a result of the installation of the profile (e.g., successful, failed, etc.). A next step 530 involves the client 203 issuing an "ackProfileOperation (ProfileOperationResult)" command to the broker (L3) 242 to indicate a result of the installation of the profile at the mobile device 102. A final step 532 involves the broker (L3) 242 issuing, to the agent (L2) 240, an "ackProfileOperation (ProfileOperationResult)" command to indicate a result of the installation of the profile at the mobile device 102.

Figure 6:
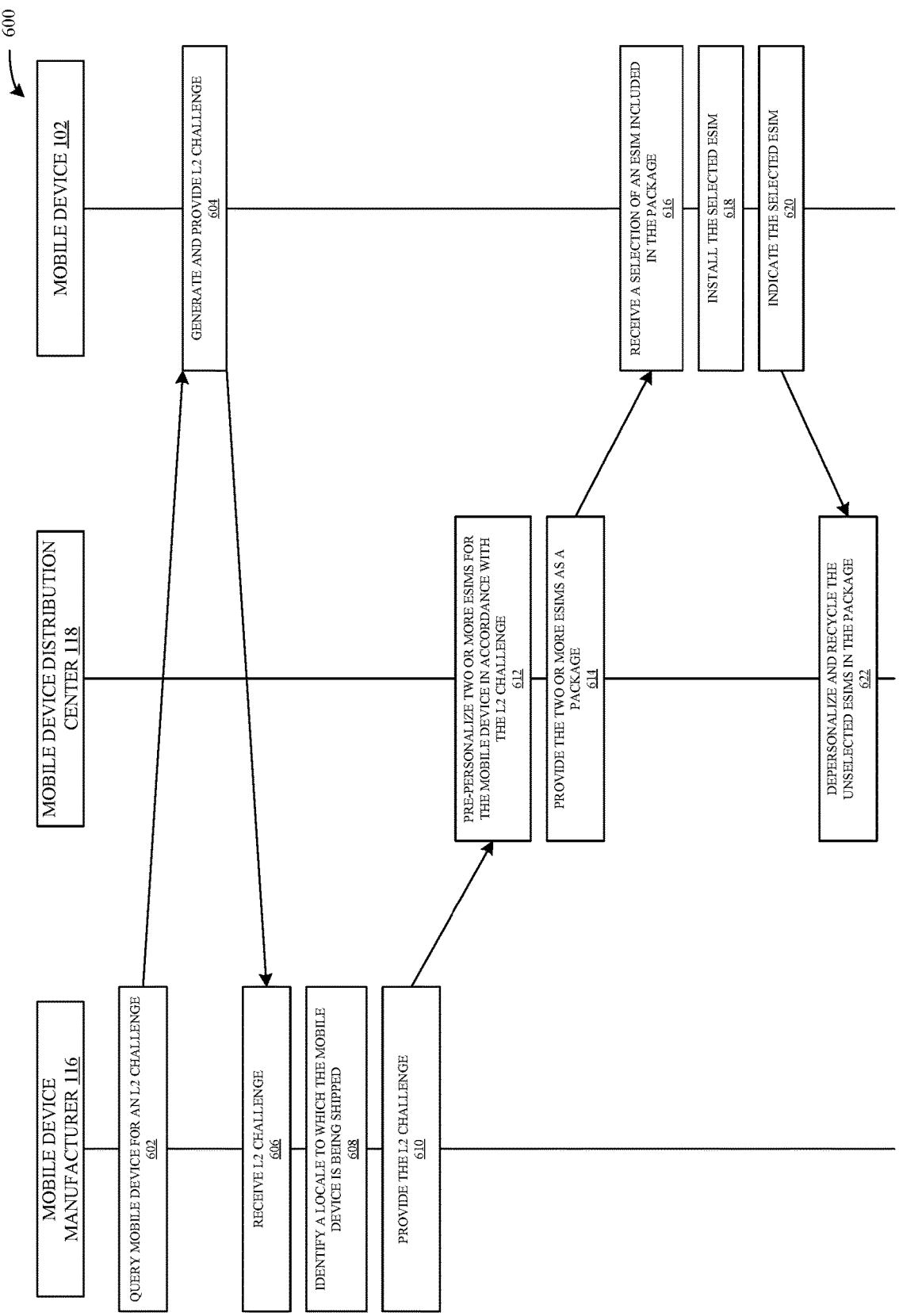
FIG. 6 illustrates a sequence diagram of a method that is carried out between the mobile device, the distribution center for the mobile device, and the manufacturer of the mobile device, according to some embodiments.

FIG. 6 illustrates a sequence diagram of a method 600 for pre-personalizing two or more eSIMs for the mobile device 102, according to some embodiments. As shown in FIG. 6, the method involves the mobile device 102, the mobile device distribution center 118, and the mobile device manufacturer 116, and begins at step 602, where the mobile device manufacturer 116 queries the mobile device 102 for an L2 challenge. At step 604, the mobile device 102 generates and provides the L2 challenge to the mobile device manufacturer 116. At step 606, the mobile device manufacturer 116 receives the L2 challenge from the mobile device 102. It is noted that steps 602-606 represent a global view of the steps of FIG. 3 described above in greater detail.

At step 608, the mobile device manufacturer 116 identifies a locale to which the mobile device 102 is being shipped. This can occur, for example, upon a decision to ship the manufactured mobile device 102 to a particular country or region for sale. At step 610, the mobile device manufacturer 116 provides the L2 challenge to the mobile device distribution center 118. At step 612, the mobile device distribution center 118 pre-personalizes two or more eSIMs for the mobile device 102 in accordance with the L2 challenge (as well as the MNOs that are within the locale). At step 614, the mobile device distribution center 118 provides the two or more eSIMs as a package to the mobile device 102. It is noted that steps 608-614 represent a global view of the steps of FIG. 4 described above in greater detail. However, as noted in step 612, the pre-personalization can involve two or more eSIMs to enable a user to select from different MNOs that are available.

At step 616, the mobile device 102 receives a selection of an eSIM included in the package. This can occur at the mobile device 102, for example, by presenting a listing of the eSIMs included in the package and receiving a selection of a particular eSIM. At step 618, the mobile device 102 installs the selected eSIM. At step 620, the mobile device 102 indicates to the mobile device distribution center 118 the selected eSIM. According to some embodiments, the mobile device 102 can be configured to retain the L2 challenge to protect against potential replay attacks that can occur down the line. Moreover, retraining the L2 challenge ensures that uniqueness remains intact when the mobile device 102 generates additional L2 challenges at subsequent times. It is noted that steps 616-620 represent a global view of the steps of FIG. 5 described above in greater detail. However, these steps involve enabling a selection of two or more eSIMs included in the eSIM package and indicating the selection to the mobile device distribution center 118.

Finally, at step 622, the mobile device distribution center 118 depersonalizes and recycles the unselected eSIMs in the package. For example, the mobile device distribution center 118 can be configured to return the unselected eSIMs to a pool of eSIMs that can subsequently be pre-personalized for other mobile devices 102.

Figure 7:
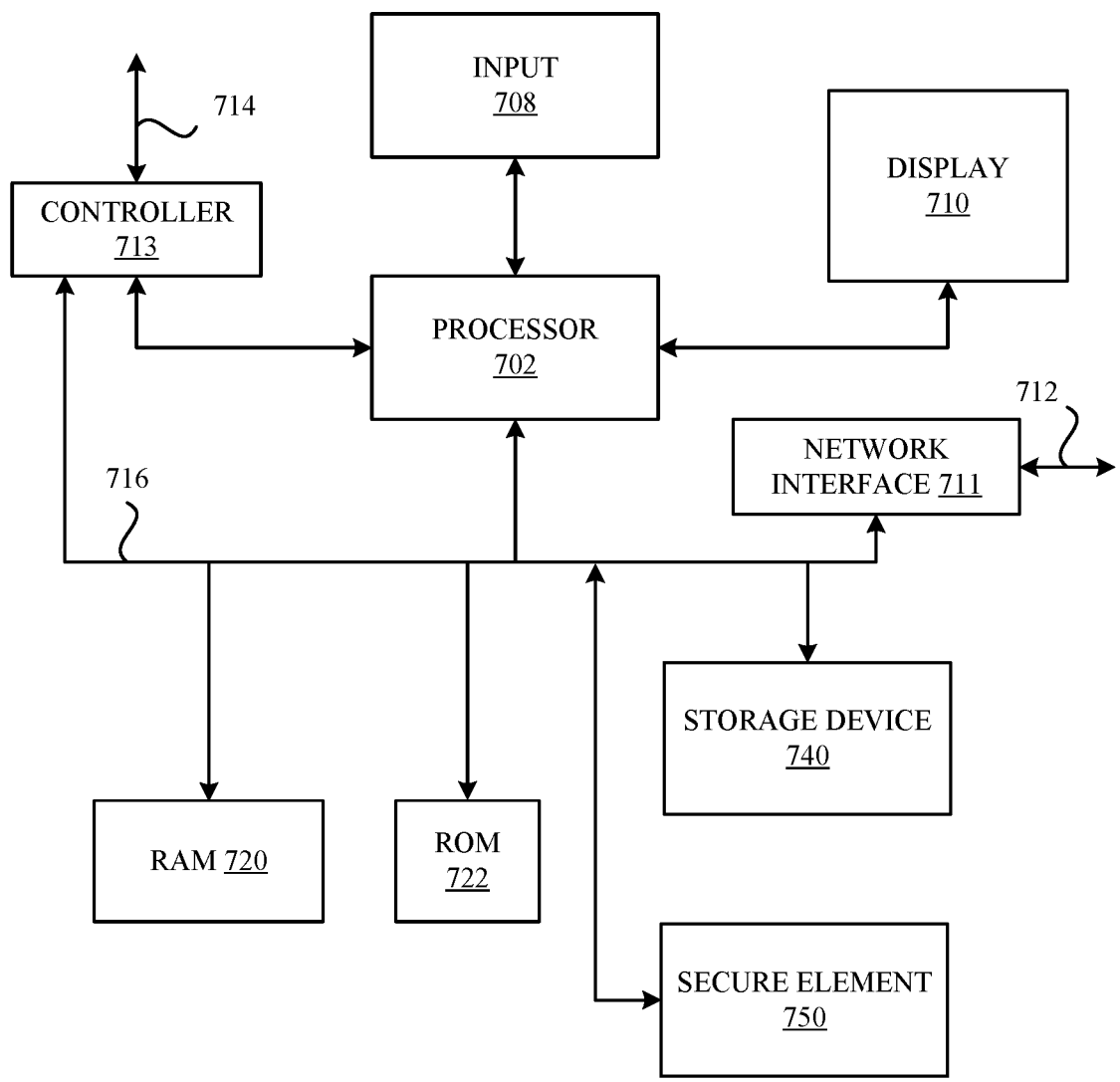
FIG. 7 illustrates a detailed view of a computing device that can be used to implement the various components described herein, according to some embodiments.

FIG. 7 illustrates a detailed view of a computing device 700 that can be used to implement the various components described herein, according to some embodiments. In particular, the detailed view illustrates various components that can be included in the mobile device 102, entities associated with the mobile device manufacturer 116/mobile device distribution center 118, and the like, illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also include a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700. The computing device 700 can further include a secure element 750, which can represent the secure element 108 illustrated in FIGS. 1-2 and described in detail herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

In some embodiments, an eSIM is provisioned to a mobile device. In particular, the mobile device may receive, from an entity associated with a manufacturer of the mobile device, a request to generate a challenge, where the request is received at a time of manufacture of the mobile device. Then, the mobile device may issue to an eUICC included in the mobile device, a command to cause the eUICC to generate the challenge. Next, the mobile device may provide the challenge to the entity, where the challenge can be used to pre-personalize the eSIM to the mobile device prior to a shipment of the mobile device to an end user.

In another embodiment, the eSIM is provisioned to the mobile device by an entity associated with a manufacturer of the mobile device. In particular, the entity may issue, to the mobile device at a time of manufacture of the mobile device, a request to generate a challenge. Then, the entity may receive the challenge from the mobile device. Next, the entity may provide the challenge to a distribution center, where the distribution center facilitates a delivery of the mobile device to an end user.

In another embodiment, the eSIM is provisioned to the mobile device by a distribution center assigned to facilitate a delivery of the mobile device to an end user. In particular, the distribution center may receive a challenge associated with the mobile device. Then, the distribution center may receive a notification that the mobile device is to be shipped to an end user. Moreover, the distribution center may identify, based on the notification, an MNO that provides services to which the mobile device will be subscribed. Furthermore, the distribution center may issue, to an entity associated with a manufacturer of the mobile device and using the challenge, a request to personalize the eSIM to the mobile device in accordance with the MNO, wherein the eSIM is pre-personalized to the mobile device. Next, the distribution center may receive the eSIM, and the distribution center may cause the mobile device to install the eSIM into an eUICC included in the mobile device.

Additionally, the distribution center may receive a batch descriptor that the eUICC uses to retrieve the eSIM when the mobile device is subsequently first activated for use. For example, the batch descriptor may have been created using a second challenge associated with the mobile device, and the second challenge may be stored on the mobile device. Note that the batch descriptor may include information specifying the MNO and a type of the eSIM. This information may replace temporary information with dummy values for the MNO and the type of the eSIM that were stored on the mobile device. In particular, the temporary information may have been stored on the mobile device when the mobile device was manufactured.

In some embodiments, the eSIM is encrypted.

Furthermore, the eUICC may be implemented on a secure element in the mobile device.

In some embodiments, an eSIM is provisioned to a mobile device. In particular, the mobile device may receive, from an entity associated with a manufacturer of the mobile device, a request to generate a challenge, where the request is received at a time of manufacture of the mobile device. Then, the mobile device may issue, to an eUICC included in the mobile device, a command to cause the eUICC to generate the challenge. Next, the mobile device may provide the challenge to the entity, where the challenge can be used to pre-personalize two or more eSIMs for the mobile device prior to a shipment of the mobile device to an end user.

In another embodiment, the eSIM is provisioned to the mobile device by a distribution center assigned to facilitate a delivery of the mobile device to an end user. In particular, the distribution center may receive a challenge associated with the mobile device. Then, the distribution center may receive a notification that the mobile device is to be shipped to an end user. Moreover, the distribution center may identify, based on the notification, a plurality MNOs capable of providing services to the mobile device. Furthermore, the distribution center may pre-personalize two or more eSIMs to the mobile device in accordance with the MNOs. Additionally, the distribution center may provide, during an initialization of the mobile device, the two or more eSIMs. Next, the distribution center may identify a selected eSIM of the two or more eSIMs, where the selected eSIM enables one or more unselected eSIMs to be identified among the two or more eSIMs, and the distribution center may depersonalize the one or more unselected eSIMs.

Note that the distribution center may return the one or more unselected eSIMs to a plurality of eSIMs that can be personalized to a different mobile device.

Another embodiment provides the mobile that performs one or more of the preceding operations.

Another embodiment provides a non-transitory computer readable storage medium that stores instructions that, when executed by a processor included in a mobile device, cause the mobile device to perform one or more of the preceding operations.

Another embodiment provides an integrated circuit that performs one or more of the preceding operations.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for provisioning an electronic Subscriber Identity Module (eSIM) to a mobile device, the method comprising, at the mobile device:
    querying an electronic Universal Integrated Circuit Card (eUICC) included in the mobile device for information associated with the eUICC;
    providing the information to a manufacturer of the mobile device, wherein the manufacturer:
        obtains an eSIM that is assigned to the mobile device but that is not assigned to any mobile network operator (MNO), and
        in response to receiving an indication that the mobile device will be subscribed to an MNO:
            associates the eSIM with the mobile network operator (MNO), and
            provides the eSIM to a distribution entity that is responsible for facilitating a delivery of the mobile device to a retailer or an end user; and
    in response to detecting an initialization of the mobile device subsequent to the delivery of the mobile device:
        providing the information to the distribution entity,
        receiving the eSIM from the distribution entity, and
        causing the eUICC to install the eSIM.

2. The method of claim 1, wherein the initialization occurs when the mobile device is being powered-on for a first time subsequent to delivery to the distribution entity from a place of manufacture of the mobile device.

3. The method of claim 1, further comprising, prior to receiving the eSIM from the distribution entity:
    issuing a "getProfile( )" command in place of a "personalizeProfile( )" command.

4. The method of claim 1, wherein:
    the mobile device receives a plurality of eSIMs, including the eSIM, from the distribution entity;
    each eSIM of the plurality of eSIMs is pre-personalized for the mobile device before the delivery of the mobile device to the retailer or the end user; and
    the method further comprises:
        receiving a selection of the eSIM in the plurality of eSIMs; and
        indicating to the distribution entity that the eSIM is installed.

5. The method of claim 1, wherein the method further comprises:
    indicating to the distribution entity that the eSIM is installed.

6. The method of claim 1, wherein the information comprises a signed identity map generated by the eUICC.

7. The method of claim 1, wherein:
    the eSIM is encrypted; and
    installing the eSIM involves the eUICC decrypting the eSIM.

8. The method of claim 1, wherein the eUICC is implemented on a secure element in the mobile device.

9. A mobile device configured to receive an electronic Subscriber Identity Module (eSIM), the mobile device comprising:
    an electronic Universal Integrated Circuit Card (eUICC);
    at least one processor; and
    at least one memory storing instructions that, when executed by the at least one processor, cause the mobile device to:
        query the eUICC for information associated with the eUICC;
        provide the information to a manufacturer of the mobile device, wherein the manufacturer:
            obtains an eSIM that is assigned to the mobile device but that is not assigned to any mobile network operator (MNO), and
            in response to receiving an indication that the mobile device will be subscribed to an MNO:
                associates the eSIM with the mobile network operator (MNO), and
                provides the eSIM to a distribution entity that is responsible for facilitating a delivery of the mobile device to a retailer or an end user; and in response to detecting an initialization of the mobile device subsequent to the delivery of the mobile device:
    provide the information to the distribution entity,
    receive the eSIM from the distribution entity, and
    cause the eUICC to install the eSIM.

10. The mobile device of claim 9, wherein the initialization occurs when the mobile device is being powered-on for a first time subsequent to delivery to the distribution entity from a place of manufacture of the mobile device.

11. The mobile device of claim 9, wherein, prior to receiving the eSIM from the distribution entity, the at least one processor further causes the mobile device to:
    issue a "getProfile( )" command in place of a "personalizeProfile( )" command.

12. The mobile device of claim 9, wherein:
    the mobile device is configured to receive a plurality of eSIMs, including the eSIM, from the distribution entity;
    each eSIM of the plurality of eSIMs is pre-personalized for the mobile device before the delivery of the mobile device to the retailer or the end user; and
    the at least one processor further causes the mobile device to:
        receive a selection of the eSIM in the plurality of eSIMs; and
        indicate to the distribution entity that the eSIM is installed.

13. The mobile device of claim 9, wherein the at least one processor further causes the mobile device to:
    indicate to the distribution entity that the eSIM is installed.

14. The mobile device of claim 9, wherein the information comprises a signed identity map generated by the eUICC.

15. The mobile device of claim 9, wherein:
    the eSIM is encrypted; and
    installing the eSIM involves the eUICC decrypting the eSIM.

16. The mobile device of claim 9, wherein:
    the mobile device further comprises a secure element; and
    the eUICC is implemented on the secure element.

17. At least one non-transitory computer-readable storage medium configured to store instructions that, when executed by at least one processor included in a mobile device, cause the mobile device to receive an electronic Subscriber Identity Module (eSIM), by carrying out steps that include:
    querying an electronic Universal Integrated Circuit Card (eUICC) included in the mobile device for information associated with the eUICC;
    providing the information to a manufacturer of the mobile device, wherein the manufacturer:
        obtains an eSIM that is assigned to the mobile device but that is not assigned to any mobile network operator (MNO), and
        in response to receiving an indication that the mobile device will be subscribed to an MNO:
            associates the eSIM with the mobile network operator (MNO), and
            provides the eSIM to a distribution entity that is responsible for facilitating a delivery of the mobile device to a retailer or an end user; and
    in response to detecting an initialization of the mobile device subsequent to the delivery of the mobile device:
        providing the information to the distribution entity,
        receiving the eSIM from the distribution entity, and
        causing the eUICC to install the eSIM.

18. The at least one non-transitory computer-readable storage medium of claim 17, wherein the initialization occurs when the mobile device is being powered-on for a first time subsequent to delivery to the distribution entity from a place of manufacture of the mobile device.

19. The at least one non-transitory computer-readable storage medium of claim 17, wherein:
    the mobile device receives a plurality of eSIMs, including the eSIM, from the distribution entity;
    each eSIM of the plurality of eSIMs is pre-personalized for the mobile device before the delivery of the mobile device to the retailer or the end user; and
    the steps further include:
        receiving a selection of the eSIM in the plurality of eSIMs; and
        indicating to the distribution entity that the eSIM is installed.

20. The at least one non-transitory computer-readable storage medium of claim 17, wherein:
    the eSIM is encrypted; and
    installing the eSIM involves the eUICC decrypting the eSIM.

* * * * *